(12) United States Patent
Astigarraga et al.

(10) Patent No.: US 9,871,725 B2
(45) Date of Patent: Jan. 16, 2018

(54) WIRELESS DATA TRANSFER AS AN ALTERNATIVE METHOD TO OVERCOME ERRORS OR NOISE IN A STORAGE ENVIRONMENT

(71) Applicant: INTERNATIONAL BUSINESS MACHINES CORPORATION, Armonk, NY (US)

(72) Inventors: Tara Astigarraga, Fairport, NY (US); Robin L. Elaiho, Tucson, AZ (US); Agueda Martinez Hernandez Magro, Zapopan (MX); Jose Roberto Mosqueda Mejia, Puruandiro (MX); Daniel J. Winarski, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 106 days.

(21) Appl. No.: 15/002,490

(22) Filed: Jan. 21, 2016

(65) Prior Publication Data
US 2017/0214605 A1    Jul. 27, 2017

(51) Int. Cl.
*H04L 12/703*   (2013.01)
*H04L 12/24*    (2006.01)
*H04L 12/707*   (2013.01)

(52) U.S. Cl.
CPC .......... *H04L 45/28* (2013.01); *H04L 41/0668* (2013.01); *H04L 45/22* (2013.01); *H04L 45/24* (2013.01)

(58) Field of Classification Search
None
See application file for complete search history.

(56) References Cited

U.S. PATENT DOCUMENTS

| | | | |
|---|---|---|---|
| 8,627,254 B2 * | 1/2014 | Kipper | G06F 17/5031 716/115 |
| 8,774,063 B2 * | 7/2014 | Beecroft | H04L 1/1607 370/248 |
| 2013/0336159 A1 | 12/2013 | Previdi et al. | |
| 2014/0094159 A1 | 4/2014 | Raleigh et al. | |
| 2015/0016276 A1 | 1/2015 | DeCusatis et al. | |

(Continued)

FOREIGN PATENT DOCUMENTS

| | | |
|---|---|---|
| EP | 2809094 A1 | 12/2014 |
| WO | 2014209007 A1 | 12/2014 |
| WO | 2015088268 A1 | 6/2015 |

OTHER PUBLICATIONS

Qadir et al., "Exploiting the Power of Multiplicity: A Holistic Survey of Network-Layer Multipath," arXiv preprint arXiv: 1502.02111, Feb. 7, 2015 (35 pages).

(Continued)

*Primary Examiner* — Anh Ngoc Nguyen
(74) *Attorney, Agent, or Firm* — Griffiths & Seaton PLLC (57) ABSTRACT

Various embodiments for managing data transmission errors in a computing storage environment, by a processor device, are provided. In one embodiment, a method comprises, in response to reaching a predetermined error threshold while routing data traffic through the computing storage environment, wirelessly transmitting at least certain data traffic from a source to a switch nearest a destination of the certain data traffic.

21 Claims, 4 Drawing Sheets

(56) References Cited

U.S. PATENT DOCUMENTS

| | | |
|---|---|---|
| 2015/0124583 A1 | 5/2015 | May et al. |
| 2015/0215195 A1 | 7/2015 | Raps et al. |
| 2016/0142318 A1* | 5/2016 | Beecroft ............... H04L 45/125 370/237 |
| 2017/0086095 A1* | 3/2017 | Chakra ............. H04W 28/0289 |

OTHER PUBLICATIONS

Zhou et al., "A Solution to Error and Loss in Wireless Network Transfer," International Conference on Wireless Networks and Information Systems, IEEE, 2009 (4 pages).

Kreutz et al., "Software-Defined Networking: A Comprehensive Survey," Proceedings of the IEEE, Version 2.01, Oct. 8, 2014 (61 pages).

* cited by examiner

FIG. 5 ns in a computer storage system in
WIRELESS DATA TRANSFER AS AN ALTERNATIVE METHOD TO OVERCOME ERRORS OR NOISE IN A STORAGE ENVIRONMENT

BACKGROUND OF THE INVENTION

Field of the Invention

The present invention relates in general to computing systems, and more particularly, to various embodiments for managing data transmission errors in computer storage environments.

Description of the Related Art

In today's society, computer systems are commonplace. Computer systems may be found in the workplace, at home, or at school. Computer systems may include data storage systems, or disk storage systems, to process and store data. Data storage systems, or disk storage systems, are utilized to process and store data. A storage system may include one or more disk drives. These data processing systems typically require a large amount of data storage. Customer data, or data generated by users within the data processing system, occupies a great portion of this data storage. These computer systems may also include virtual storage components.

SUMMARY OF THE INVENTION

Various embodiments for managing data transmission errors in a computing storage environment, by a processor device, are provided. In one embodiment, a method comprises, in response to reaching a predetermined error threshold while routing data traffic through the computing storage environment, wirelessly transmitting at least certain data traffic from a source to a switch nearest a destination of the certain data traffic.

In addition to the foregoing exemplary embodiment, various other system and computer program product embodiments are provided and supply related advantages. The foregoing summary has been provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Described embodiments, and illustrative Figures of various embodiments for managing data transmission errors in a computer storage system are to follow. In the interest of clarity, not all features of an actual implementation are described in this Specification. It will of course be appreciated by the skilled artisan, that in the development of any such actual embodiment, numerous implementation-specific decisions must be made to achieve the developers' specific goals, such as compliance with system-related and business-related constraints, which will vary from one implementation to another. Furthermore, it will be appreciated that such a development effort may be complex and labor-intensive, but would nevertheless be a routine undertaking for those of ordinary skill in the art having the benefit of this Disclosure.

Computer storage systems such as storage area network (SAN) environments are changing in many client and development test labs across the industry. The number of components, such as switches, in these environments is expanding, creating more complex configurations, a mixture of performance speeds and multiple data protocols. With the many variables seen in storage environments, the need for a centralized component (or software) to recognize data path errors rapidly and provide an alternate solution that can transition data seamlessly, as to not lose data or cause performance issues, is increasingly a necessity. Problems that plague a storage environment can range from dirt or dust particles within the physical connection of a Fibre channel, physical mistreatment of cabling or equipment, data traffic bottlenecks due to the mixed speed environments, over subscription and/or slow draining devices, etc. Issues such as these can cause storage performance degradation, or even large scale complications leading to data corruption and loss. Software defined environments (SDEs) provide some relief in configuration and capabilities that help alleviate some of these problems, however, the amount of time to identify, isolate and reconfigure data flow in a SDE may still cause a client's environment disruption and potential outages.

In view of the foregoing, the mechanisms of the illustrated embodiments provide various solutions to previous challenges of data transmission errors in computer storage systems. These mechanisms include such functionality as using an automated data rerouting technique to seamlessly deliver critical data, as will be further described.

The mechanisms may be applicable to a variety of network topologies and network components as will be further described. Notwithstanding the illustration of some of the functionality attendant to the various embodiments, one of ordinary skill will appreciate that the methodologies herein may be adapted to a wide variety of implementations and scenarios as noted above.

Figure 1:
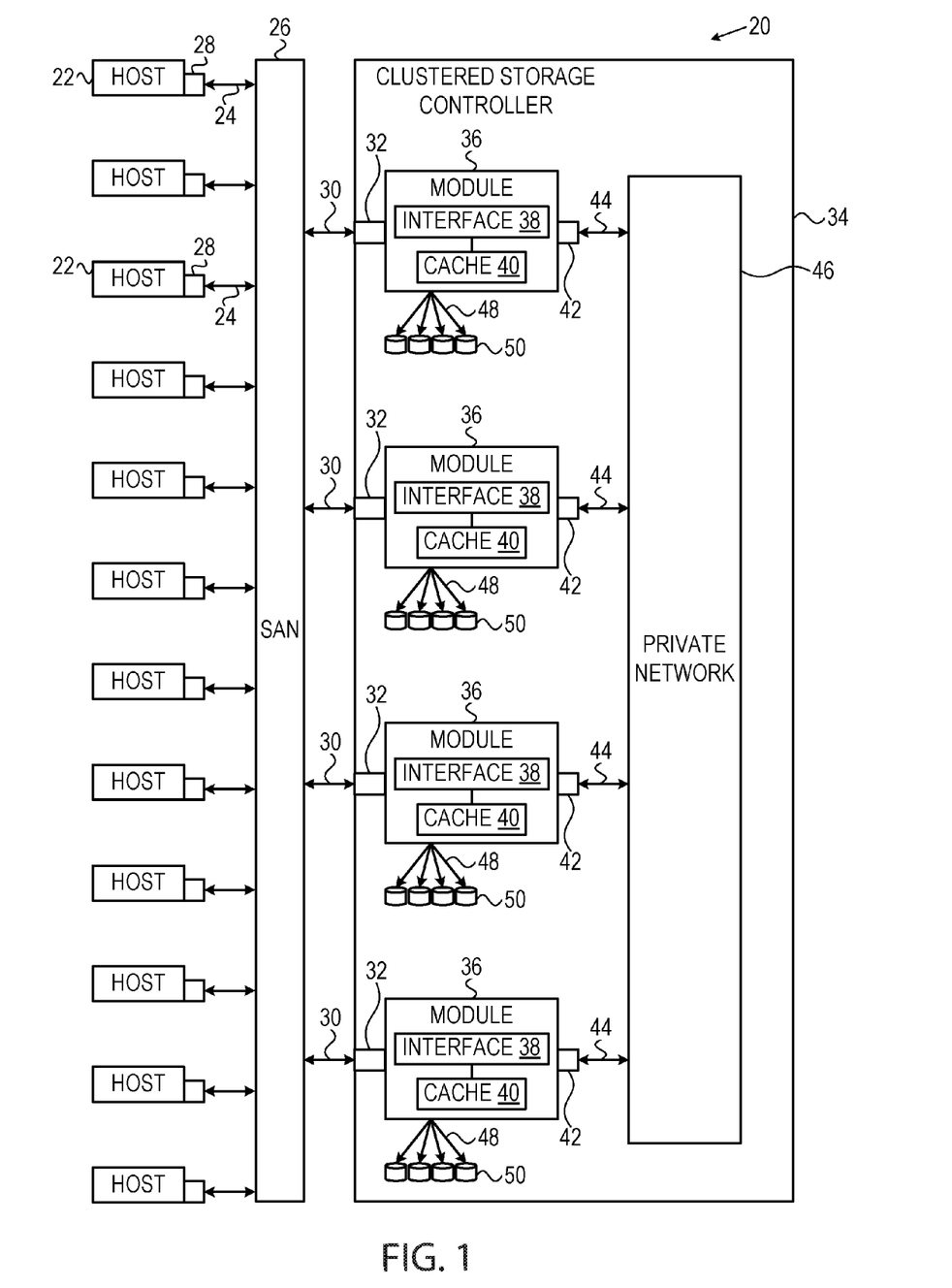
FIG. 1 is a block diagram illustrating a computer storage environment in which aspects of the present invention may be realized.

Turning now to FIG. 1, a schematic pictorial illustration of a data processing storage subsystem 20 is shown, in accordance with a disclosed embodiment of the invention. The particular subsystem shown in FIG. 1 is presented to facilitate an explanation of the invention. However, as the skilled artisan will appreciate, the invention can be practiced using other computing environments, such as other storage subsystems with diverse architectures and capabilities.

Storage subsystem 20 receives, from one or more host computers 22, input/output (I/O) requests, which are commands to read or write data at logical addresses on logical volumes. Any number of host computers 22 are coupled to storage subsystem 20 by any means known in the art, for example, using a network. Herein, by way of example, host computers 22 and storage subsystem 20 are assumed to be coupled by a Storage Area Network (SAN) 26 incorporating data connections 24 and Host Bus Adapters (HBAs) 28. The logical addresses specify a range of data blocks within a logical volume, each block herein being assumed by way of example to contain 512 bytes. For example, a 10 KB data record used in a data processing application on a given host computer 22 would require 20 blocks, which the given host computer might specify as being stored at a logical address comprising blocks 1,000 through 1,019 of a logical volume. Storage subsystem 20 may operate in, or as, a SAN system.

Storage subsystem 20 comprises a clustered storage controller 34 coupled between SAN 26 and a private network 46 using data connections 30 and 44, respectively, and incorporating adapters 32 and 42, again respectively. In some configurations, adapters 32 and 42 may comprise host SAN adapters (HSAs). Clustered storage controller 34 implements clusters of storage modules 36, each of which includes an interface 38 (in communication between adapters 32 and 42), and a cache 40. Each storage module 36 is responsible for a number of storage devices 50 by way of a data connection 48 as shown.

As described previously, each storage module 36 further comprises a given cache 40. However, it will be appreciated that the number of caches 40 used in storage subsystem 20 and in conjunction with clustered storage controller 34 may be any convenient number. While all caches 40 in storage subsystem 20 may operate in substantially the same manner and comprise substantially similar elements, this is not a requirement. Each of the caches 40 may be approximately equal in size and is assumed to be coupled, by way of example, in a one-to-one correspondence with a set of physical storage devices 50, which may comprise disks. In one embodiment, physical storage devices may comprise such disks. Those skilled in the art will be able to adapt the description herein to caches of different sizes.

Each set of storage devices 50 comprises multiple slow and/or fast access time mass storage devices, herein below assumed to be multiple hard disks. FIG. 1 shows caches 40 coupled to respective sets of storage devices 50. In some configurations, the sets of storage devices 50 comprise one or more hard disks, which can have different performance characteristics. In response to an I/O command, a given cache 40, by way of example, may read or write data at addressable physical locations of a given storage device 50. In the embodiment shown in FIG. 1, caches 40 are able to exercise certain control functions over storage devices 50. These control functions may alternatively be realized by hardware devices such as disk controllers (not shown), which are linked to caches 40.

Each storage module 36 is operative to monitor its state, including the states of associated caches 40, and to transmit configuration information to other components of storage subsystem 20 for example, configuration changes that result in blocking intervals, or limit the rate at which I/O requests for the sets of physical storage are accepted.

Routing of commands and data from HBAs 28 to clustered storage controller 34 and to each cache 40 may be performed over a network and/or a switch. Herein, by way of example, HBAs 28 may be coupled to storage modules 36 by at least one switch (not shown) of SAN 26, which can be of any known type having a digital cross-connect function. Additionally, or alternatively, HBAs 28 may be coupled to storage modules 36.

In some embodiments, data having contiguous logical addresses can be distributed among modules 36, and within the storage devices in each of the modules. Alternatively, the data can be distributed using other algorithms, e.g., byte or block interleaving. In general, this increases bandwidth, for instance, by allowing a volume in a SAN or a file in network attached storage to be read from or written to more than one given storage device 50 at a time. However, this technique requires coordination among the various storage devices, and in practice may require complex provisions for any failure of the storage devices, and a strategy for dealing with error checking information, e.g., a technique for storing parity information relating to distributed data. Indeed, when logical unit partitions are distributed in sufficiently small granularity, data associated with a single logical unit may span all of the storage devices 50.

While not explicitly shown for purposes of illustrative simplicity, the skilled artisan will appreciate that in some embodiments, clustered storage controller 34 may be adapted for implementation in conjunction with certain hardware, such as a rack mount system, a midplane, and/or a backplane. Indeed, private network 46 in one embodiment may be implemented using a backplane. Additional hardware such as the aforementioned switches, processors, controllers, memory devices, and the like may also be incorporated into clustered storage controller 34 and elsewhere within storage subsystem 20, again as the skilled artisan will appreciate. Further, a variety of software components, operating systems, firmware, and the like may be integrated into one storage subsystem 20.

Figure 2:
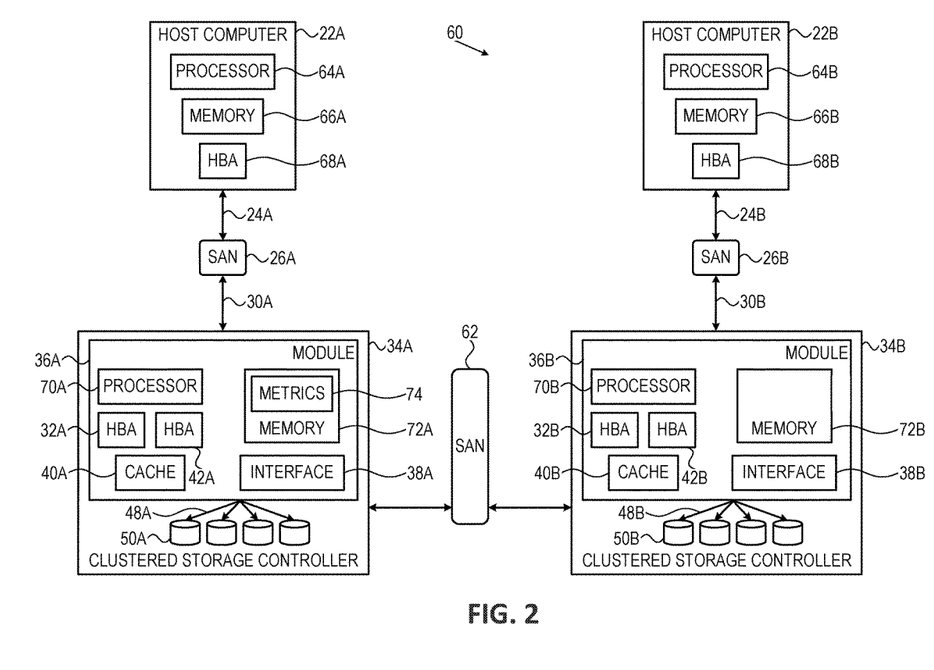
FIG. 2 is a block diagram illustrating a hardware structure of an exemplary data storage system in a computer system in which aspects of the present invention may be realized.

FIG. 2 is a schematic pictorial illustration of facility 60 configured to perform host computer monitoring, in accordance with an embodiment of the present invention. In the description herein, host computers 22, storage controllers 34 and their respective components may be differentiated by appending a letter to the identifying numeral, so that facility 60 comprises a first host computer 22A (also referred to herein as a primary host computer) coupled to a clustered storage controller 34A via a SAN 26A, and a second host computer 22B (also referred to herein as a secondary host computer) coupled to a clustered storage controller 34B via a SAN 26B. In the configuration shown in FIG. 2 storage controllers 34A and 34B are coupled via a facility SAN 62.

Host computer 22A comprises a processor 64A, a memory 66A, and an adapter 68A. Adapter 68A is coupled to SAN 26A via a data connection 24A.

As described supra, module 36A is coupled to storage devices 50A via data connections 48A, and comprises adapters 32A and 42A, a cache 40A, and an interface 38A. Module 36A also comprises a processor 70A and a memory 72A. As explained in detail hereinbelow, processor 70A is configured to establish metrics 74 that indicate a connectivity status of host computer 22A, and store the metrics to memory 72A. In some embodiments, processor 70A may store metrics 74 to storage devices 50A.

Host computer 22B comprises a processor 64B, a memory 66B, and an adapter 68B. Adapter 68B is coupled to SAN 26B via a data connection 24B.

As described supra, module 36B is coupled to storage devices 50B via data connections 48B, and comprises adapters 32B and 42B, a cache 40B, and an interface 38B. Module 36B also comprises a processor 70B and a memory 72B.

Processors 64A, 64B, 70A and 70B typically comprise general-purpose computers, which are programmed in software to carry out the functions described herein. The software may be downloaded to host computers 22A and 22B and modules 36A and 36B in electronic form, over a network, for example, or it may be provided on non-transitory tangible media, such as optical, magnetic or electronic memory media. Alternatively, some or all of the functions of the processors may be carried out by dedicated or programmable digital hardware components, or using a combination of hardware and software elements.

Examples of adapters 32A, 32B, 42A, 42B, 68A and 68B, include switched fabric adapters such as Fibre Channel (FC) adapters, Internet Small Computer System Interface (iSCSI) adapters, Fibre Channel over Ethernet (FCoE) adapters and Infiniband™ adapters.

While the configuration shown in FIG. 2 shows storage host computers 22A and 22B coupled to storage controllers 34A and 34B via SANs 26A and 26B, other configurations are to be considered within the spirit and scope of the present invention. For example, host computers 22A and 22B can be coupled to a single storage controller 34 via a single SAN 26.

Figure 3:
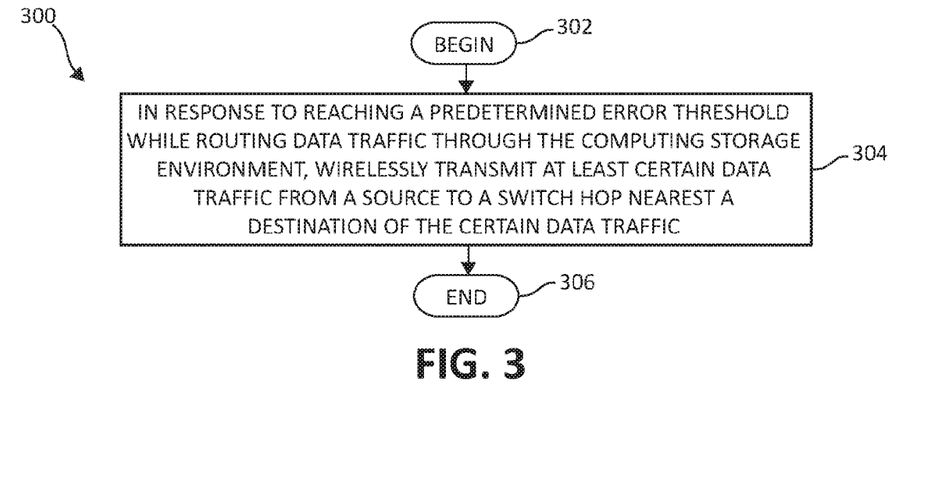
FIG. 3 is a flow chart illustrating a method for managing data transmission errors in a computer storage system in accordance with aspects of the present invention.

Continuing to FIG. 3, a method 300 for managing data transmission errors in a computer storage system is illustrated, in accordance with one embodiment of the present invention. The method 300 may be performed in accordance with the present invention in any of the environments depicted in FIGS. 1-2, among others, in various embodiments. Of course, more or less operations than those specifically described in FIG. 3 may be included in method 300, as would be understood by one of skill in the art upon reading the present descriptions.

Each of the steps of the method 300 may be performed by any suitable component of the operating environment. For example, in various embodiments, the method 300 may be partially or entirely performed by a processor, or some other device having one or more processors therein. The processor, e.g., processing circuit(s), chip(s), and/or module(s) implemented in hardware and/or software, and preferably having at least one hardware component may be utilized in any device to perform one or more steps of the method 300. Illustrative processors include, but are not limited to, a central processing unit (CPU), an application specific integrated circuit (ASIC), a field programmable gate array (FPGA), etc., combinations thereof, or any other suitable computing device known in the art.

Beginning at step 302, in response to reaching a predetermined error threshold while routing data traffic through a computing storage environment, at least certain data traffic is wirelessly transmitted from a source to a switch nearest a destination of the certain data traffic (step 304). The method ends (step 306).

In various described embodiments, the present invention enables an alternative path for certain data traffic in a computer storage environment. In one embodiment, the certain data traffic may be data traffic designated as high-priority. In other embodiments, the certain data may be any specified data. The mechanisms described herein may be particularly useful to SDEs, although one skilled in the art would recognize the functionality provided by the present invention may be used in any computing environment capable of implementing such described techniques.

These mechanisms provide an automated data path rerouting option that allows data traffic to downshift protocols thereby allowing data traffic to bypass problematic storage system areas and wirelessly arrive to a targeted destination using a wireless technology. In one exemplary embodiment, the Bluetooth® standard is used to exchange the data traffic, although here again, one skilled in the art would recognize that any wireless standard may be used to accomplish this functionality.

In one embodiment, the storage environment (e.g. SDE) manages network switches by periodically monitoring and checking transmitted data and the reliability of the data path and switches there between. The storage environment monitors for disruptions, such as packet corruption, cyclic redundancy check (CRC) errors, or other issues that could cause noise on the data link. In some embodiments, the storage environment may provide monitoring for bottleneck and slow draining device detection. Once the point of error is detected, the storage environment determines options to bypass switches causing the underlying problem or re-route specific or high priority path traffic via wireless to the target to alleviate data loss or downtime. As discussed, re-routing data flagged as "high priority data" may be an efficient approach to ensure the most important data is preserved, while the storage environment checks a data stream flagged (e.g. as congested) for further investigation and resolution, however, any certain data may be routed using this technique.

The wireless link speed for data may vary depending on the protocol. In certain embodiments, down shifting to a lower speed (and/or different protocol) to allow the data to continue seamlessly over a more reliable connection, may be implemented. In this case, although the link speed is slower, the data would be transmitted through a dedicated link such that data traffic would be minimal compared to all of the data travelling on the original link.

As aforementioned, this functionality may be particularly well suited to SDEs, however these mechanisms may also be implemented in a traditional switch environment with the introduction of new features and routing protocol options between switch hops, and additionally may utilize data center bridging capability exchange (DCBX) enhancements included in the FCoE protocol to better enhance routing capabilities of FC encapsulated data.

Figure 4:
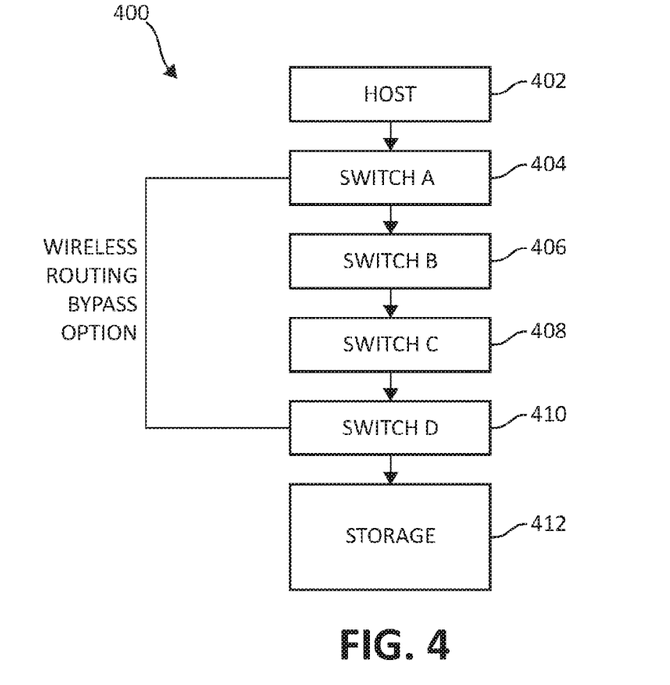
FIG. 4 is a block diagram illustrating a hardware structure of a computer storage environment in accordance with aspects of the present invention.

Advancing to FIG. 4, a block diagram 400 of a storage environment hardware structure is illustrated. Diagram 400 depicts exemplary components within a data path that data traffic transmitted from a source to a target may travel through. Included are host 402, switch A 404, switch B 406, switch C 408, switch D 410, and storage 412. As will be discussed further in FIG. 5, upon determining that a predetermined error threshold has been reached after detecting errors in a given portion of the data path (e.g. switch A 404), an alternate data path may be chosen by the storage environment for certain data traffic. If errors continue to exist within the alternate data path, a wireless session between a first switch and the switch nearest the target destination of the certain data traffic (i.e. between switch A 404 and switch D 410) may be initiated, and the certain data traffic transmitted wirelessly there between, as to bypass the problematic area of the data path. In other words, a wireless session is initiated at switch A 404, at which portion of the network where errors were detected, and data traffic bypassed to the nearest switch hop prior to the target destination as provided by a target destination identification (ID) of the data traffic (i.e. switch D 410). The nearest switch prior to the target of the data traffic is determined by looking up the destination ID of the data traffic and determining at what location the target switch is logged in.

Figure 5:
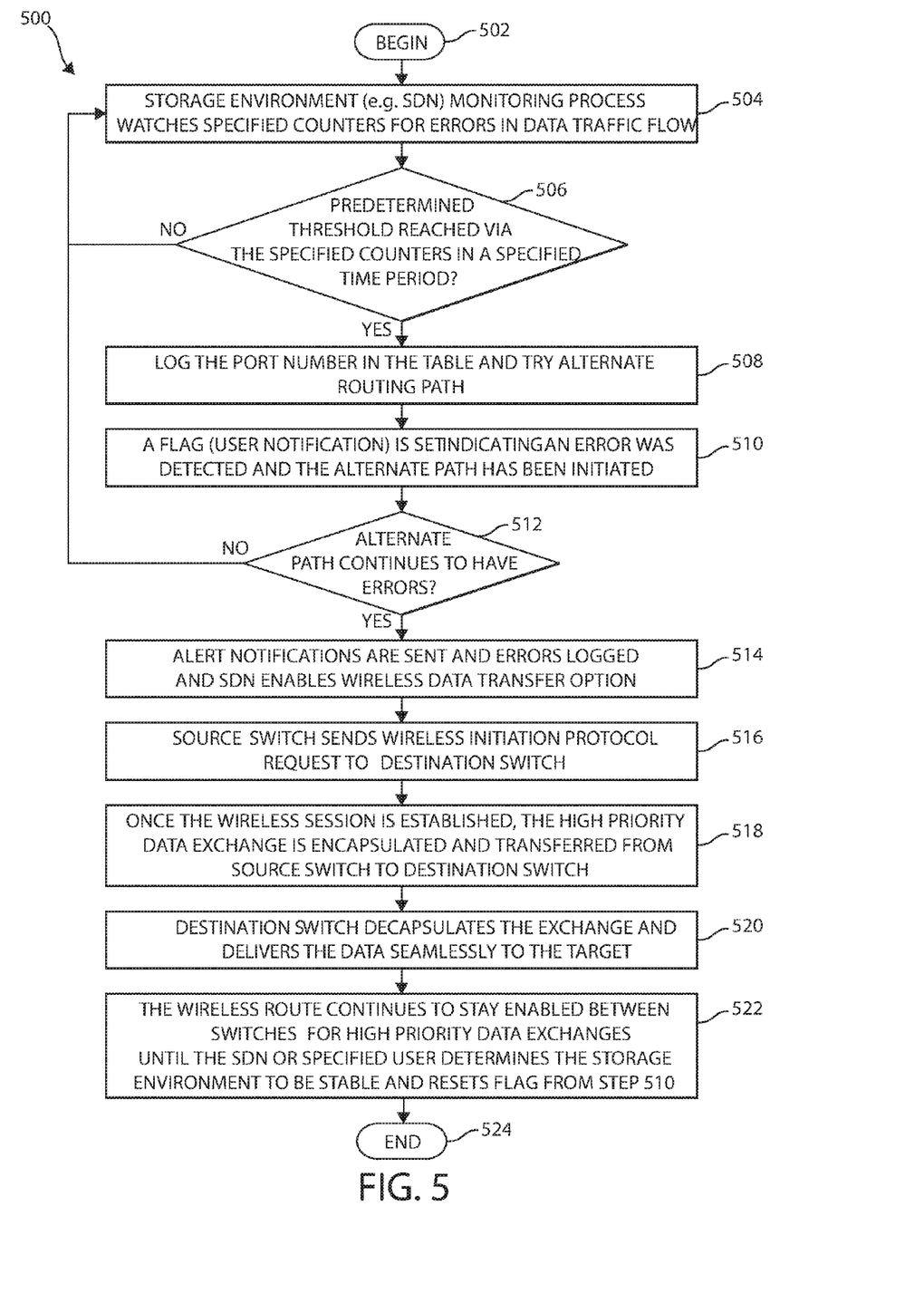
FIG. 5 is an additional flow chart illustrating a method for managing data transmission errors in a computer storage system in accordance with aspects of the present invention.

FIG. 5 illustrates an additional flow chart of a method 500 for managing data transmission errors in a computer storage system. The method 500 may be performed in accordance with the present invention in any of the environments depicted in FIGS. 1-2, among others, in various embodiments. Of course, more or less operations than those specifically described in FIG. 5 may be included in method 500, as would be understood by one of skill in the art upon reading the present descriptions.

Each of the steps of the method 500 may be performed by any suitable component of the operating environment. For example, in various embodiments, the method 500 may be partially or entirely performed by a processor, or some other device having one or more processors therein. The processor, e.g., processing circuit(s), chip(s), and/or module(s) implemented in hardware and/or software, and preferably having at least one hardware component may be utilized in any device to perform one or more steps of the method 500. Illustrative processors include, but are not limited to, a central processing unit (CPU), an application specific integrated circuit (ASIC), a field programmable gate array (FPGA), etc., combinations thereof, or any other suitable computing device known in the art.

Beginning at step 502, while routing data traffic through the storage environment, detected errors on a given port are logged in error counters, and the storage environment (e.g. SDN) monitoring process watches specified counters for errors in the data traffic flow (step 504). If a predetermined counter threshold is not reached in a predetermined timeframe, the method returns to step 504 (step 506). If, at step 506, a predetermined counter threshold is reached within the predetermined timeframe, the port number at which the counter threshold was reached is logged, an alternate data path is initiated (step 508), and a flag (user notification) is set indicating that the counter threshold has been reached and the alternate data path has been started (step 510). If the alternate data path does not continue to have errors as determined by way of a predetermined error threshold (step 512), the method returns to step 504.

Returning to step 512, if the alternate data path continues to have errors and a predetermined error threshold is reached, an additional log and user notification is set indicating that a wireless bypass session will be initiated (step 514). The switch at which the errors were originally detected (e.g. switch A 404) sends a wireless initiation protocol request to the switch nearest the target destination of the data traffic (e.g. switch D 410). The nearest switch prior to the target of the data traffic is determined by looking up the destination ID of the data traffic and determining at what location the target switch is logged in (step 516). Once the wireless session is established, the certain (e.g. high-priority) data traffic is encapsulated by the source and transferred between the switches (e.g. between switch A 404 and switch D 410) (step 518). The destination switch (e.g. switch D 410) then decapsulates the exchange and delivers the data seamlessly to the target (step 520). The wireless session continues to stay enabled between the two switches for certain, or high-priority, data exchanges until the storage environment or a specified user determines the storage environment to be stable, and therefore resets the flag set in step 510. The storage environment may be determined to be stable once the predetermined counter threshold has no longer reached, the predetermined error threshold has no longer been reached, or here again, by a specified user of the computing storage environment (step 522). The method ends (step 524).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While one or more embodiments of the present invention have been illustrated in detail, the skilled artisan will appreciate that modifications and adaptations to those embodiments may be made without departing from the scope of the present invention as set forth in the following claims.

What is claimed is:

1. A method for managing data transmission errors in a computing storage environment, by a processor device, comprising:
   in response to reaching a predetermined error threshold while routing data traffic through the computing storage environment, wirelessly transmitting at least certain data traffic from a source to a switch nearest a destination of the certain data traffic.

2. The method of claim 1, further including monitoring specified error counters of a data path of the computing storage environment;
   upon reaching a predetermined counter threshold for at least one of the specified error counters in a predetermined timeframe, logging a port number of the data path;
   setting a user notification; and
   routing the certain data traffic through an alternate data path.

3. The method of claim 2, further including, upon reaching the predetermined error threshold within the alternate data path, determining the switch nearest the destination of the certain data traffic by looking up a destination identification (ID).

4. The method of claim 3, further including sending a wireless initiation protocol request from the source to the switch nearest the destination of the certain data traffic; and
   establishing a wireless session between the source and the switch nearest the destination of the certain data traffic.

5. The method of claim 3, further including encapsulating the certain data traffic by the source;
   wirelessly transferring the certain data traffic from the source to the switch nearest the destination of the certain data traffic; and
   decapsulating the certain data traffic by the switch nearest the destination of the certain data traffic, and delivering the certain data traffic to a target.

6. The method of claim 4, further including maintaining the wireless session between the source and the switch nearest the destination of the certain data traffic until one of the predetermined counter threshold is no longer reached, the predetermined error threshold is no longer reached, and a specified user terminates the connection.

7. The method of claim 1, wherein the certain data traffic is one of specified data and data designated as high-priority data.

8. A system for managing data transmission errors in a computing storage environment, the system comprising:
   at least one processor device executing instructions stored in a memory, wherein when executed, cause the at least one processor device to:
   in response to reaching a predetermined error threshold while routing data traffic through the computing storage environment, wirelessly transmit at least certain data traffic from a source to a switch hop nearest a destination of the certain data traffic.

9. The system of claim 8, wherein the at least one processor device monitors specified error counters of a data path of the computing storage environment;
   upon reaching a predetermined counter threshold for at least one of the specified error counters in a predetermined timeframe, logs a port number of the data path,
   sets a user notification, and
   routes the certain data traffic through an alternate data path.

10. The system of claim 9, wherein the at least one processor device, upon reaching the predetermined error threshold within the alternate data path, determines the switch nearest the destination of the certain data traffic by looking up a destination identification (ID).

11. The system of claim 10, wherein the at least one processor device sends a wireless initiation protocol request from the source to the switch nearest the destination of the certain data traffic; and
    establishes a wireless session between the source and the switch nearest the destination of the certain data traffic.

12. The system of claim 10, wherein the at least one processor device encapsulates the certain data traffic by the source;
    wirelessly transfers the certain data traffic from the source to the switch nearest the destination of the certain data traffic; and
    decapsulates the certain data traffic by the switch nearest the destination of the certain data traffic, and delivering the certain data traffic to a target.

13. The system of claim 11, wherein the at least one processor device maintains the wireless session between the source and the switch nearest the destination of the certain data traffic until one of the predetermined counter threshold is no longer reached, the predetermined error threshold is no longer reached, and a specified user terminates the connection.

14. The system of claim 8, wherein the certain data traffic is one of specified data and data designated as high-priority data.

15. A computer program product for managing data transmission errors in a computing storage environment, by a processor device, the computer program product embodied on a non-transitory computer-readable storage medium having computer-readable program code portions stored therein, the computer-readable program code portions comprising:
    an executable portion that, in response to reaching a predetermined error threshold while routing data traffic through the computing storage environment, wirelessly transmits at least certain data traffic from a source to a switch hop nearest a destination of the certain data traffic.

16. The computer program product of claim 15, further including an executable portion that monitors specified error counters of a data path of the computing storage environment;
    upon reaching a predetermined counter threshold for at least one of the specified error counters in a predetermined timeframe, logs a port number of the data path;
    sets a user notification; and
    routes the certain data traffic through an alternate data path.

17. The computer program product of claim 16, further including an executable portion that, upon reaching the predetermined error threshold within the alternate data path, determines the switch nearest the destination of the certain data traffic by looking up a destination identification (ID).

18. The computer program product of claim 17, further including an executable portion that sends a wireless initiation protocol request from the source to the switch nearest the destination of the certain data traffic; and
    establishes a wireless session between the source and the switch nearest the destination of the certain data traffic.

19. The computer program product of claim 17, further including an executable portion that encapsulates the certain data traffic by the source;
    wirelessly transfers the certain data traffic from the source to the switch nearest the destination of the certain data traffic; and
    decapsulates the certain data traffic by the switch nearest the destination of the certain data traffic, and delivering the certain data traffic to a target.

20. The computer program product of claim 18, further including an executable portion that maintains the wireless session between the source and the switch nearest the destination of the certain data traffic until one of the predetermined counter threshold is no longer reached, the predetermined error threshold is no longer reached, and a specified user terminates the connection.

21. The computer program product of claim 15, wherein the certain data traffic is one of specified data and data designated as high-priority data.

\* \* \* \* \*